United States Patent Office 2,778,713

Patented Jan. 22, 1957

1

2,778,713

HYDROTHERMAL TREATMENT OF AN AGGLOMERATE OF SYNTHETIC MICA CRYSTALS

Tokiti Noda, Los Angeles, Calif.

No Drawing. Application December 23, 1953, Serial No. 400,089

12 Claims. (Cl. 23—110)

This invention relates to a method of treating an agglomerate mass of crystals formed from a siliceous melt to render the individual crystal amenable to separation from the mass, and more particularly to a method of treating an agglomerate mass of synthetic mica crystals to render the individual crystals amenable to separation from the mass and to improve the separated crystals.

Included among the objects and advantages is a process for hydrothermally treating a mass of crystals bound together by a siliceous impurity to render the individual crystals amenable to separation from the mass without breaking. The hydrothermal treatment devitrifies the surface adhesive siliceous material so that the individual crystals are soft and pliable and suitable for punching, stamping and like operations. The treatment may be used to control the hydrolysis of mica crystals to change the characteristics of the mica. These and other objects and advantages may be readily understood by the following description.

In one method of making synthetic mica crystals, as for example, such as described in Japanese Patent No. 138,642, a mass of fluoro-phlogopite or its isomorphous substitutes are melted, from about 1400° to 1500° C. or higher depending on the composition, and then promoting crystal growth in the melt at about the crystallization temperature large individual crystals of mica are formed. As the crystals form, however, they form in an agglomerated mass interspersed with surplus component other than mica composition, which is a siliceous impurity, which forms in between the crystals and on the surface of the individual mica crystals in the mass. The deleterious siliceous inclusion in the mica mass is a glassy substance comprising generally a silicate containing one or more of potassium, aluminum, magnesium and fluorine ions. The glassy inclusion binds the mica crystals together in a mass and makes it difficult to split the individual crystals from each other, and, further, the glassy substance adheres to the individual crystals making them hard and brittle. In this condition the crystals are not suitable for punching, stamping, die work, and the like.

In accordance with the present invention I have discovered the process for treating a mass of an agglomerate of synthetic mica crystals for rendering the individual mica crystals amenable to separation and for devitrifying the glassy inclusions to make the individual crystals pliable and easily worked. The process includes a hydrothermal treatment which is heating a mass of the synthetic mica crystals in water at an elevated temperature for a period of time to deteriorate by corrosion or devitrification the glassy substance which adheres to and binds the individual mica crystals. The process, also, includes a partial hydrolysis of the fluoro-phlogopite to form a mica which is equivalent to natural phlogopite, or the hydrolysis may be suppressed in the treatment to provide for the recovery of the fluoro-phlogopite crystals. In the hydrothermal treatment of the synthetic

2 mica, the fluorine ion may be replaced by the hydroxyl ion under conditions of the treatment, and due to this hydrolysis the synthetic mica is converted to very nearly the same composition as that of the natural mica. In certain instances, however, the hydrolysis may be deleterious to the mica, since the fluoro form is thermally stable whereas the hydroxyl or the natural form is not. The process, therefore, provides for suppression of the hydrolysis during the treatment when it is desired to recover the fluoro or synthetic form of the mica.

The process in general contemplates heating a mass of an agglomerate of synthetic mica crystals in an autoclave in aqueous solution to temperatures above about 100° C. for a period of time extending from several to 48 hours or more depending on the mass to be treated. The mass may be hydrothermally treated in an aqueous electrolytic solution to produce the corrosion or devitrification of the deleterious inclusion in the mica crystal mass along with the hydrolysis where desirable. Where the fluoro form of the mica crystals is desired, a hydrolysis suppressor is included in the aqueous electrolyte solution. Such a hydrolysis suppressor may be fluorine compounds such as fluorides, fluosilicates, and the like which suppress the hydrolysis.

The following examples will describe the invention in more detail:

*Example I*

Blocks of synthetic mica crystals (fluoro-phlogopite) were treated with water at 350° C. for 24 hours in an autoclave. The fluorine content of the untreated mass was 13.9% and that of the treated blocks was 13.5%. (The fluorine content provides a measure of the action of the treatment on the individual mica crystals.) The treated blocks of the synthetic mica were easily separated into individual crystals without breakage, and the crystals were sufficiently pliable to be suitable for punching, stamping, and like operations.

*Example II*

Blocks of the similar crystalline mass as disclosed in Example I were treated with an aqueous 2 N sodium hydroxide solution at 350° for 24 hours. The fluorine content of the treated blocks was 13.0%. The blocks were readily split into the individual mica crystals, and the crystals were soft and flexible.

*Example III*

Blocks of the crystalline material similar to Example I were treated in the 2 N sodium hydroxide solution at 350° for 48 hours. The crystalline mass was easily split into the individual crystals. The fluorine content of the treated blocks had decreased to about 8.6%.

*Example IV*

Blocks of similar crystalline mass as illustrated in Example I were treated with a 2 N sodium hydroxide solution containing about 4% sodium fluorine at 350° for 48 hours. The fluorine content of the treated blocks were 11.2%. The mass was easily separated into individual mica crystals.

*Example V*

Blocks of a similar crystalline mass as described in Example I were treated with a 2 N sodium hydroxide solution containing 5% sodium fluoro-silicate ($Na_2SiF_6$) at 350° C. for 48 hours. The crystals were easily separated into individual crystals of mica, and the fluorine content of the treated blocks was 12.7%. By increasing the sodium fluoro silicate, the decrease of fluorine content could be made even smaller.

*Example VI*

Blocks of synthetic mica crystalline mass as described in Example I were treated with a 1 N potassium hydroxide solution containing 5% potassium fluoro-silicate ($K_2SiF_6$) at 250° C. for 24 hours. The splitting of a mass into individual crystals is easily accomplished.

*Example VII*

Blocks of synthetic mica similar to that described in Example I is treated with a ½ N potassium hydroxide solution containing 5% potassium fluoride at 250° C. for 24 hours. The splitting of the block into individual crystals is greatly facilitated.

*Example VIII*

Blocks of synthetic mica as described in Example I were treated with a 16 N potassium carbonate solution at 250° C. for 24 hours. The splitting of the crystals from the block is easily accomplished.

After treating the synthetic crystalline mass, single crystals of mica may be easily split off from the mass. The mica crystals may be separated from the mass without breaking the individual crystals which provides a good yield of large single individual crystals. The individual crystals are soft and elastic and substantially free from the glassy inclusion of the surface of the crystals. The soft elastic crystals are suitable for punching, stamping and other similar types of operation.

As described above, the decrease of fluorine content in the synthetic mica may be suppressed to a minimum when a suppressor is added to the reacting solution, so that substantially the same synthetic crystal may be recovered after the treatment. By reducing the hydrolysis of the fluoro-mica to a minimum the thermal stability, a characteristic property of synthetic mica, is not deteriorated. The suppressor may be used in amounts up to 10% or more, depending on the composition of the mass, and with fluoro-phlogopite about 5% concentration of the fluorine compounds is sufficient to suppress the hydrolysis during the hydrothermal treatment.

The hydrothermal treatment of the synthetic crystalline mica blocks may be performed at the elevated temperatures either in water or an aqueous solution of electrolytes, such as bases, acids, or salts. Since the action is carried out at elevated temperatures, the treatment is conducted in a closed vessel, such as an autoclave, bomb and the like to provide for the high temperatures and the resultant pressures of the super-heated aqueous reaction media.

The invention has been illustrated by specific examples but there is no intent to limit the invention to the specific details so disclosed, except insofar as set out in the following claims.

I claim:

1. The method of treating an agglomerate of synthetic mica crystals and deleterious binding material prior to separating individual crystals therefrom which comprises superheating above about 100 degrees C. a mass of such an agglomerate of synthetic mica crystals in an aqueous solution in the presence of a soluble fluoride composition as a hydrolysis suppressor to render the mass amenable to separation into individual crystals and substantially remove the deleterious binding material from the crystals.

2. The method of treating an agglomerate of synthetic mica crystals and deleterious binding material prior to separating individual crystals therefrom which comprises superheating above about 100 degrees C. a mass of such an agglomerate of synthetic mica crystals in an aqueous electrolyte solution in the presence of a soluble fluoride composition as a hydrolysis suppressor to render the mass amenable to separation into individual crystals and substantially remove the deleterious binding material from the crystals.

3. The method of treating an agglomerate of synthetic mica crystals and deleterious binding material prior to separating individual crystals which comprises superheating above about 100 degrees C. a mass of such an agglomerate of synthetic mica crystals in an aqueous alkaline solution in the presence of a soluble fluoride composition as a hydrolysis suppressor to render the mass amenable to separation into individual crystals and substantially remove the deleterious binding material from the crystals.

4. The method of treating an agglomerate of synthetic mica crystals prior to separating individual crystals therefrom which comprises heating a mass of such an agglomerate of synthetic mica crystals in water at about 350° C. for about twenty-four hours to devitrify the siliceous impurities binding said crystals and render them amenable to separation.

5. The method of treating an agglomerate of synthetic mica crystals prior to separating individual crystals therefrom which comprises heating in an autoclave a mass of such an agglomerate of synthetic mica crystals in an aqueous sodium hydroxide solution at temperatures above about 100° C., in the presence of a soluble fluorine compound as a hydrolysis suppressor.

6. The method of treating an agglomerate of synthetic mica crystals prior to separating individual crystals which comprises heating a mass of such an agglomerate of synthetic mica crystals in an aqueous electrolyte solution at temperatures above about 100° C., for a period of time sufficient to devitrify the deleterious crystal binding impurities and in the presence of a soluble fluorine compound as a hydrolysis suppressor.

7. The method of treating an agglomerate of synthetic mica crystals prior to separating individual crystals which comprises heating in an autoclave a mass of such an agglomerate of synthetic mica crystals in an aqueous sodium hydroxide solution at temperatures above about 100° C., for a period of time sufficient to devitrify the deleterious crystal binding impurities and in the presence of sodium fluoride as a hydrolysis suppressor.

8. The method of treating an agglomerate of synthetic mica crystals prior to separating individual crystals which comprises heating in an autoclave a mass of such an agglomerate of synthetic mica crystals in a 2 N sodium hydroxide aqueous solution at temperatures above about 100° C., for a period of time sufficient to devitrify the deleterious crystal binding material, and in the presence of five percent of sodium fluorosilicate as a hydrolysis suppressor.

9. The method of treating an agglomerate of synthetic mica crystals formed from a siliceous melt and including siliceous impurities binding the mica crystals together which comprises superheating a mass of such an agglomerate of synthetic mica crystals in an alkaline solution substantially above 100 degrees C. for an extended period of time so as to devitrify the siliceous impurities and render such mica crystals amenable to separation into large individual crystals.

10. The method of treating an agglomerate of synthetic mica crystals formed from a siliceous melt and including deleterious impurities binding the crystals together prior to separating individual crystals therefrom, which comprises superheating in an autoclave a mass of such synthetic mica crystals in an aqueous electrolyte solution above about 100 degrees C. for a sufficient time to devitrify the impurities binding the crystals and render them amenable to separation.

11. The method of treating an agglomerate of synthetic mica crystals formed from a siliceous melt and including deleterious impurities binding the crystals together prior to separating individual crystals therefrom, which comprises superheating in an autoclave a mass of such synthetic mica crystals in an aqueous electrolyte and soluble fluoride solution above about 100 degrees C. for a sufficient time to devitrify the impurities binding the crystals and render them amenable to separation.

12. The method of treating an agglomerate of synthetic mica crystals formed from a siliceous melt and including deleterious impurities binding the crystals together prior to separating individual crystals therefrom, which comprises superheating in an autoclave a mass of such synthetic mica crystals in an aqueous potassium hydroxide solution above about 100 degrees C. for a sufficient time to devitrify the impurities binding the crystals and render them amenable to separation.

References Cited in the file of this patent

UNITED STATES PATENTS

| | | |
|---|---|---|
| 2,185,280 | Stuckardt et al. | Jan. 2, 1940 |
| 2,516,983 | Hatch | Aug. 1, 1950 |
| 2,645,060 | Waggoner | July 14, 1953 |
| 2,549,880 | Bardet | Apr. 24, 1951 |

OTHER REFERENCES

Kendall et al.: "Proceeding of International Congress of Pure and Applied Chemistry," pages 167–170 (1947).

Wyart et al.: "Chem. Abstracts," vol. 44, 1950, column 7722. C. A. citing "Compte Rendu," vol. 229, pages 131–3 (1949).